(12) United States Patent
Hoikkala

(10) Patent No.: US 6,182,506 B1
(45) Date of Patent: Feb. 6, 2001

(54) ARRANGEMENT FOR PERFORMING A CONTACT PATTERN TEST OF BEVEL GEARS

(75) Inventor: Pekka Hoikkala, Ylinen (FI)

(73) Assignee: ATA Gears Ltd., Tampere (FI)

( * ) Notice: Under 35 U.S.C. 154(b), the term of this patent shall be extended for 0 days.

(21) Appl. No.: 09/026,678

(22) Filed: Feb. 20, 1998

(30) Foreign Application Priority Data

Feb. 21, 1997 (DE) .......................................... 297 03 157 U

(51) Int. Cl.[7] .......................... G01M 13/02; F16H 1/14; F16H 1/20; B23F 1/00; B23C 9/00
(52) U.S. Cl. ........................ 73/162; 74/423; 74/424; 409/61; 409/133
(58) Field of Search ................... 73/162; 409/61, 409/133; 74/423, 424

(56) References Cited

U.S. PATENT DOCUMENTS

| 4,024,757 | * | 5/1977 | Raess et al. | ............................ 73/162 |
| 5,307,676 | * | 5/1994 | Gutman | ................................. 73/162 |

FOREIGN PATENT DOCUMENTS

| 1 777 339 | 8/1972 | (DE) . |
| 43 05 408 A1 | 8/1994 | (DE) . |
| 43 42 648 A1 | 6/1995 | (DE) . |
| 195 17 358 | 10/1996 | (DE) . |

OTHER PUBLICATIONS

Cutting Bevel Gears Better, Faster; American Machinist, Jun. 1978; pp. 82–85.

* cited by examiner

Primary Examiner—Hezron Williams
Assistant Examiner—Dennis Loo
(74) Attorney, Agent, or Firm—Burns, Doane, Swecker & Mathis, L.L.P.

(57) ABSTRACT

An arrangement performs a contact pattern test of bevel gears when they are produced. The arrangement includes a testing unit in connection with a machining apparatus, to which testing unit a finished bevel gear can be fastened to rotate around its axis so that the finished bevel gear and the other bevel gear which is being finished can be arranged into a rotating contact with each other so as to allow the contact pattern of the cogs to be checked.

4 Claims, 1 Drawing Sheet

ARRANGEMENT FOR PERFORMING A CONTACT PATTERN TEST OF BEVEL GEARS

Figure 1:
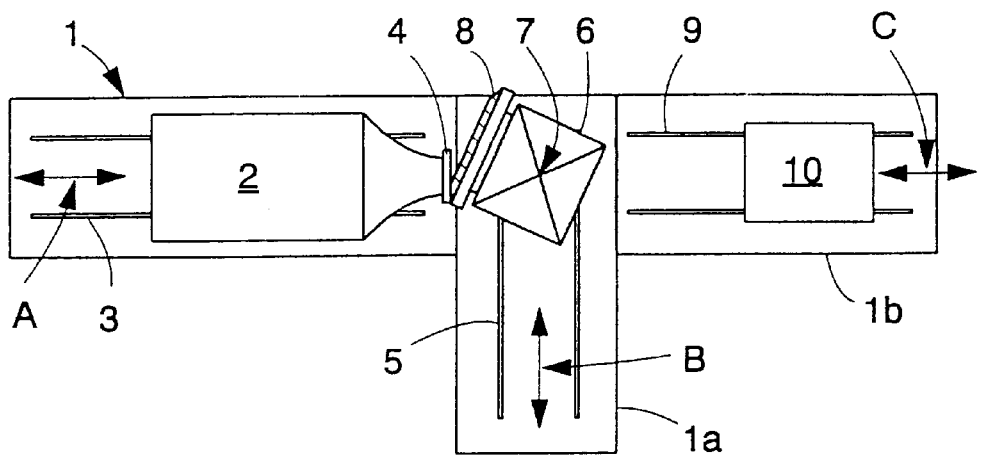

This application claims priority under 35 U.S.C. §§119 and/or 365 to Appln. 29703157.0 filed in Germany on Feb. 21, 1997; the entire content of which is hereby incorporated by reference.

The invention relates to an arrangement for performing a contact pattern test of bevel gears which are to rotate in tooth contact when the machining of the bevel gears is carried out in a machining apparatus, which comprises a body, a machining unit and a fastening unit which are movable in relation to the body, which fastening unit can be turned around a vertical axis and onto which the bevel gear to be machined is to be mounted for the duration of the machining.

When bevel gears are produced, the larger bevel gear, i.e. the crown wheel, is finished first, whereafter the smaller bevel gear forming its pair, i.e. the pinion, is machined so that a small finishing margin is left. Then the crown wheel and the pinion are arranged to a separate machine into the right position in relation to each other, and by rotating them in tooth contact, usually by using a marking colour, it is determined how the cogging of the pinion has to be finished so that the contact between the cogs would be correct. After this the pinion is moved back to the machining apparatus and positioned to the workpiece spindle of the fastening unit for finishing. After the finishing a new contact pattern test is performed in the testing unit, and if necessary, a new finishing. This is repeated as many times as is necessary for achieving the desired contact pattern.

This testing procedure is rather laborious and time-consuming, since the crown wheel and the pinion have to be positioned very carefully and accurately so that the bevel gear set would work as it should when arranged in its final place. Installation of the pinion to the workpiece spindle as well as to the testing apparatus is very difficult and time-consuming. It is also inconvenient and time-consuming to move parts which may weigh even several tons, and the parts may be damaged during the transfer phases and the intermediate processing phase.

An object of the present invention is to provide an arrangement which allows to avoid the drawbacks of the prior art solutions and allows a contact pattern test to be performed fast and effectively without unnecessary waste of time and extra damage. The arrangement of the invention is characterized in that the arrangement comprises a testing unit in connection with the machining apparatus, to which testing unit one of the bevel gears or the bevel gear set can be fastened after its machining so that it can rotate around its rotational axis, the testing unit and the fastening unit being movable so that after the latter bevel gear of the bevel gear set has been machined, said units can be moved into such a position in relation to each other that the position of the bevel gears enables the contact pattern test without unfastening the latter bevel gear from the fastening unit.

An essential idea of the invention is that the machining apparatus of the bevel gears comprises a testing unit to which the crown wheel can be arranged so that it rotates around a horizontal axis. A further essential idea of the invention is that the testing unit can be moved into such a position in relation to the body of the machining apparatus that the pinion fastened to the workpiece spindle can be brought into contact with the crown wheel by turning the workpiece spindle around the vertical axis so as to allow the contact pattern test to be performed without unfastening the pinion from the workpiece spindle.

An advantage of the invention is that the machining of the pinion and the contact pattern test between the crown wheel and the pinion can be performed with only one fastening of the pinion, which allows to avoid extra unfastening and positioning. Furthermore, it is not necessary to move the pinion and crown wheel from the machining apparatus to a separate testing machine, which reduces the risk of damage considerably. In addition, the crown wheel with its fasteners can be moved directly to the testing unit from the workpiece spindle, whereby it can be positioned simply and easily.

The invention will be described in the accompanying drawings, in which

Figure 2:
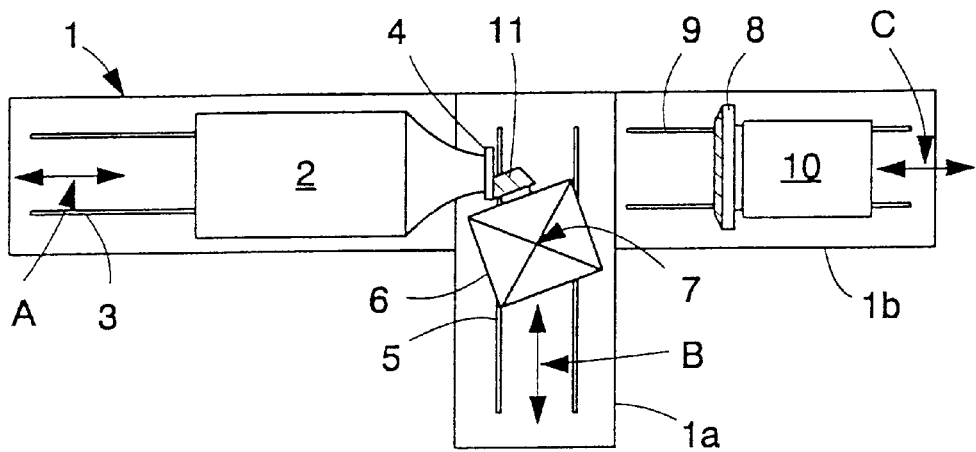
Figure 3:
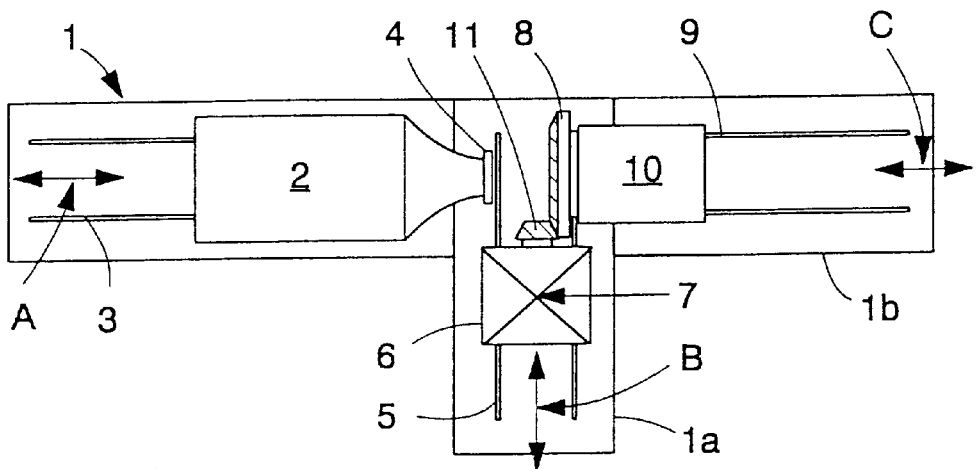

FIG. 1 schematically illustrates the arrangement of the invention with a crown wheel in the machining position, FIG. 2 schematically illustrates the arrangement of the invention with a crown wheel in the testing position and a pinion in the machining position, and FIG. 3 schematically illustrates the arrangement of the invention during a contact pattern test of the pinion and the crown wheel.

FIG. 1 schematically illustrates a conventional machining apparatus of bevel gears which comprises a body 1. On the body 1 there is a machining unit 2, which can move lengthwise with respect to the body 1 along a guide track 3 in both directions according to arrow A. The machining unit 2, which is fully known per se in the field, comprises the necessary motors, shafts and fixing means for fastening and operating the machining means, e.g. a cutter head 4, during the machining. Machining units of this kind, such as milling machines and grinding machines, as well as their moving and operating principles and structures are fully known in the field, and thus they will not be described in any greater detail in this context.

The body 1 comprises a transversal body 1a, on which there is a fastening unit 6 arranged to move along guide tracks 5 in the opposite directions in a manner known per se as shown by arrow B. The crown wheels and pinions to be machined are fastened for the duration of the machining to a workpiece spindle inside the fastening unit, which spindle is arranged to rotate around a horizontal axis in a manner known per se. The fastening unit 6 and its workpiece spindle can be turned around a vertical axis 7 so that the workpiece to be machined can be arranged at a desired angle in relation to the machining means of the machining unit so as to be able to machine cogs of the correct angle and shape. Usually, the workpiece spindle of the fastening unit has to be rotated during the machining so as to form cogs of an appropriate shape. In FIG. 1 the crown wheel 8 with a larger diameter in the conventional bevel gear set is fastened to the fastening unit 6, and it is normally machined first to its final dimensions. The figure also shows an auxiliary body 1b connected to the body 1. A testing unit 10 is arranged on the auxiliary body on the guide tracks 9 parallel to the machining unit so that the unit can move in the opposite directions as shown by arrow C. The auxiliary body 1b and the transversal body 1a may be a fixed part of the body 1, whereby they are immobile in relation to each other. On the other hand, the auxiliary body may also be a separate part of the body, which rests firmly and immovably in relation to the body 1 on the base below the body 1 and the auxiliary body 1b.

FIG. 2 illustrates the arrangement of the invention in a situation in which the crown wheel 8, which was in the machining position in FIG. 1, has been moved to the testing unit 10 and fastened to the workpiece spindle rotating around the horizontal axis of the testing unit 10. Furthermore, a second, smaller bevel gear, i.e. a pinion, has been arranged to the fastening unit 6, which has been turned to such an angle that the cogging of the pinion 11 can be machined in the desired way. During the machining of the pinion nothing is done to the crown wheel 8, and the testing unit 10 can be kept further away from the machining unit 2 and fastening unit 6 so as to provide enough space for fastening and mounting the pinion 11.

When the pinion 11 has been machined so that it is nearly finished, a contact pattern test is performed with the arrangement of the invention. In the situation illustrated in FIG. 3 the testing unit 10 has been moved toward the machining unit 2 and the fastening unit 6 so that it is in an appropriate position in relation to the vertical turning axis 7 of the fastening unit. After this the fastening unit 6 has been turned around its vertical axis and moved a desired distance in the direction of the guide tracks 5 so that the cogging of the pinion 11 takes an appropriate position in relation to the cogging of the crown wheel 8. The contact pattern test is performed at this stage, whereafter the pinion is moved back to the machining position shown in FIG. 2, and it is finished, whereafter a new contact pattern test is performed in the position shown in FIG. 3. If necessary, this can be repeated several times without unfastening the crown wheel 8 or the pinion 11 until the desired contact pattern has been achieved. During the contact pattern test the pinion in the fastening unit is rotated with rotating means, while the rotation of the crown wheel 8 in contact with it is slowed down with braking means. In practice, it is possible to use for rotating the pinion 11 either a separate rotating apparatus or the rotating mechanism of the machining means of the machining unit, which can be separately arranged to rotate the pinion. In that case the moment generated during the contact pattern test when the pinion rotates and the crown wheel is slowed down provides a situation corresponding to the normal operating conditions, and thus the contact pattern test gives as truthful and accurate picture of the contact pattern as possible.

In connection with the contact pattern test it is possible to use different measuring devices known per se and different type of automation, which allow to monitor and control the test. Such technology is generally known per se and is not directly relevant to the present invention, and thus it will not explained in greater detail in this context.

The present invention allows to avoid separate transfers and the long installation periods required by them, while the production time of a workpiece decreases considerably compared to the prior art solutions. The arrangement according to the invention is particularly preferable for use in the production of large bevel gears, but it can also be applied to the production of smaller bevel gears, whereby the results are similar. If necessary, several crown wheels can be finished first and they can thereafter be fastened one at a time to the testing unit for the duration of the machining and contact pattern test of the pinion arranged to the crown wheel in question. The widely used conventional machining apparatuses of bevel gears comprise one main motor which is usually in the machining unit and is used for rotating the cutter head and, if necessary, the workpiece spindle in the fastening unit and the bevel gear to be machined. In newer CNC machining apparatuses it is typical to employ direct drive, i.e. each unit has a rotating mechanism of its own, and thus they can be rotated completely independently from one another.

What is claimed is:

1. An arrangement for performing a contact pattern test of bevel gears which are to rotate in tooth contact when the machining of the bevel gears is carried out in a machining apparatus, which comprises a body, a machining unit and a fastening unit which are movable in relation to the body, which fastening unit can be turned around a vertical axis and onto which the bevel gear to be machined is to be mounted for the duration of the machining, the arrangement further comprising a testing unit in connection with the machining apparatus, to which testing unit one of the bevel gears or the bevel gear set can be fastened after its machining so that it can rotate around its rotational axis, the testing unit and the fastening unit being movable so that after the latter bevel gear of the bevel gear set has been machined, said units can be moved into such a position in relation to each other that the position of the bevel gears enables the contact pattern test without unfastening the latter bevel gear from the fastening unit.

2. An arrangement as claimed in claim 1, comprising means for rotating the bevel gear in the fastening unit and means for slowing down the rotation of the bevel gear in the testing unit during the contact pattern test.

3. An arrangement as claimed in claim 2, wherein the bevel gear in the fastening unit can be arranged to be rotated by the rotating mechanism of the machining unit.

4. An arrangement as claimed in claim 2, wherein the fastening unit comprises a separate rotating mechanism for rotating the bevel gear in the fastening unit.

* * * * *